(12) United States Patent
Fazekas

(10) Patent No.: US 10,197,173 B2
(45) Date of Patent: Feb. 5, 2019

(54) DEVICE FOR AUTOMATIC INFLATION-DEFLATION OF A CONTAINMENT CAPACITY FOR A PRESSURIZED GASEOUS FLUID

(71) Applicant: TELEFLOW, Mably (FR)

(72) Inventor: Stéphane Fazekas, Noailly (FR)

(73) Assignee: TELEFLOW, Mably (FR)

( * ) Notice: Subject to any disclaimer, the term of this patent is extended or adjusted under 35 U.S.C. 154(b) by 55 days.

(21) Appl. No.: 15/310,417

(22) PCT Filed: May 6, 2015

(86) PCT No.: PCT/FR2015/051199
§ 371 (c)(1),
(2) Date: Nov. 10, 2016

(87) PCT Pub. No.: WO2015/173493
PCT Pub. Date: Nov. 19, 2015

(65) Prior Publication Data
US 2017/0268683 A1    Sep. 21, 2017

(30) Foreign Application Priority Data

May 13, 2014   (FR) ...................................... 14 54228

(51) Int. Cl.
*F16K 15/20*   (2006.01)
*B60C 23/00*   (2006.01)

(52) U.S. Cl.
CPC .......... *F16K 15/202* (2013.01); *B60C 23/003* (2013.01); *Y10T 137/3646* (2015.04)

(58) Field of Classification Search
CPC ......... Y10T 137/3464; Y10T 137/3584; Y10T 137/3646
USPC .................................................. 152/415, 417
See application file for complete search history.

(56) References Cited

U.S. PATENT DOCUMENTS

| 3,491,786 A | 1/1970 | Crossman et al. |
| 3,747,626 A | 7/1973 | Valentino |
| 4,744,399 A | 5/1988 | Magnuson et al. |
| 4,895,199 A | 1/1990 | Magnuson et al. |

(Continued)

FOREIGN PATENT DOCUMENTS

| DE | 10 2007 036 201 A1 | 2/2009 |
| EP | 0 511 135 A1 | 10/1992 |

*Primary Examiner* — R. K. Arundale
(74) *Attorney, Agent, or Firm* — Seed IP Law Group LLP

(57) ABSTRACT

Described herein is an inflation/deflation device of the type comprising a portion provided with an intake orifice for taking in a gaseous fluid under pressure, and a portion provided firstly with an inflation/deflation orifice designed to communicate with the confinement capacity, and secondly with a discharge orifice opening out between the two portions; and a valve member control system for inflation/deflation operations per se. In accordance with the invention, one of the portions is provided with arrangements for receiving a washer, which arrangements are suitable for allowing said washer to deform elastically, under the effect of a pressure of a gaseous fluid discharging through the discharge orifice, so as to release face-on bearing by an annular protuberance provided on the other portion, and so as to generate a fluid discharge passage between said annular protuberance and said washer.

3 Claims, 2 Drawing Sheets

(56) References Cited

U.S. PATENT DOCUMENTS

| | | | |
|---|---|---|---|
| 4,938,272 A * | 7/1990 | Sandy, Jr. | ............. B60C 23/003 |
| | | | 137/225 |
| 5,181,977 A * | 1/1993 | Gneiding | ................ B60C 29/06 |
| | | | 137/224 |
| 6,827,096 B1 | 12/2004 | Kayukawa | |
| 7,104,274 B2 | 9/2006 | Sampson | |
| 2002/0170597 A1* | 11/2002 | Colussi | ................ B60C 23/003 |
| | | | 137/226 |
| 2009/0095359 A1 | 4/2009 | Campau | |
| 2009/0308462 A1* | 12/2009 | Badstue | ................ B60C 29/06 |
| | | | 137/230 |
| 2010/0300566 A1 | 12/2010 | Roberts et al. | |

* cited by examiner

DEVICE FOR AUTOMATIC INFLATION-DEFLATION OF A CONTAINMENT CAPACITY FOR A PRESSURIZED GASEOUS FLUID

BACKGROUND

Technical Field

The present invention relates to the technical field of devices for automatically inflating/deflating a capacity, e.g., a pneumatic tire of a vehicle wheel, using a gaseous fluid under relative pressure.

It is sometimes useful to be able to inflate or deflate the tires of the wheels of a vehicle remotely, so as to adapt the footprints and bearing capacities of said tires as a function of the state of the terrain over which the vehicle is moving.

This applies in particular to all-terrain vehicles that must be capable of making progress under the best possible conditions, equally well when travelling over hard, stony, and soft terrain in succession, without the driver being forced to interrupt the progress to make an appropriate correction to the inflation pressures of the various tires manually and while the vehicle is at a standstill.

This application is given merely by way of example because, in many fields, it is also useful or even necessary to be able to adapt remotely the inflation pressure of any confinement capacity for confining a gaseous fluid under relative pressure.

Description of the Related Art

To solve the above problem, it is known from the state of the art that it is possible to use a device 1 for automatically inflating/deflating a capacity. With reference to FIGS. 1 and 2 that show such a device 1 in longitudinal section, such a device comprises:

a first portion 2 including a control system 3 mounted to slide in a first chamber 4 under the effect of injection of a gaseous fluid via an intake orifice 5; and a second portion 6, coupled to the first portion 2, and defining a second chamber 7 with an inflation/deflation orifice 8 designed to communicate with the confinement capacity (not shown), and a discharge orifice 9 opening out between said first and second portions 2, 6, said second portion 6 including a valve member 10 secured to the control system 3 in such a manner that it takes up a rest position in which it closes off the discharge orifice 9 and, when the control system 3 slides, it takes up a deflation position opposing a resilient return member 11 and in which it opens the discharge orifice 9.

When a gaseous fluid is injected into it, that device causes the control system to slide and thus causes the valve member to open the discharge orifice so as to deflate the confinement capacity.

That device may, for example, be mounted on all-terrain vehicles, which travel through puddles, dust, and/or mud. Sprayed dust, mud, and water can penetrate into the inflation/deflation device and damage it.

To mitigate that drawback, it is known from the state of the art that a protective washer 12 may be incorporated. That washer 12, which is preferably made of an elastomer material, is mounted between the first and second portions 2, 6 and around the discharge orifice 9 so as to protect it against external atmospheric agents, such as mud, water, and dust, or any other undesirable element that can be detrimental to operation of the device.

More precisely, that washer 12 is of frustoconical shape, the small base 12a of which shape, namely the inner perimeter of the washer 12 bears in sealed manner against the first portion 2, and its large base 12b, namely the outer perimeter of the washer 12 bears in sealed manner against the second portion 6.

That washer 12 makes it possible to maintain the device 1 sealed and to procure optimum protection from sprays and splashes of mud, water, dust, or any other element.

However, that solution for providing the sealing suffers from a major drawback. While the confinement capacity is being deflated, i.e., while gaseous fluid, in particular air, is being expelled from the device, and is being discharged via the discharge orifice, the washer made of an elastomer material is folded back to allow the air to discharge between said washer and the second portion. In other words, the large base of the frustoconical shape is pushed back towards its small base. Since the large base no longer in bearing contact, it finds itself in empty space. As a function of the pressure of the gaseous fluid that is released, the washer made of an elastomer material starts vibrating, thereby generating non-negligible undesired noise.

Such noise can be relatively problematic in certain fields, in particular when the device equips vehicles that are required to have a certain amount of stealth, e.g., military vehicles.

BRIEF SUMMARY

An object of the invention is thus to remedy at least the above-mentioned drawback by proposing a device for inflating/deflating a capacity that is protected from external atmospheric agents, and in which the noise generated by it operating is reduced so as no longer to be problematic.

Another object of the invention is to provide such a device that is of simple, safe, and rational design.

To these ends, the invention thus provides an inflation/deflation device for automatically inflating/deflating a confinement capacity for confining a gaseous fluid under pressure, which device is of the type comprising:

a portion provided with an intake orifice for taking in a gaseous fluid under pressure, and a portion provided firstly with an inflation/deflation orifice designed to communicate with the confinement capacity, and secondly with a discharge orifice opening out between the two portions;

a valve member control system for inflation/deflation operations per se; and an elastically deformable washer mounted between the two portions and around the discharge orifice for protecting it from external atmospheric agents.

In accordance with the invention, and to provide optimum sealing, while also reducing the undesired noise due to the device operating, one of the portions is provided with arrangements for receiving the washer, which arrangements are suitable for allowing said washer to deform elastically, under the effect of a pressure of a gaseous fluid discharging through the discharge orifice, so as to release face-on bearing formed by an annular protuberance provided on the other portion, and so as to generate a fluid discharge passage between said annular protuberance and said washer.

In this way, while the confinement capacity is being deflated, i.e., while gaseous fluid is discharging via the discharge orifice, said fluid constrains the protective washer to deform elastically, and in particular to curve in the washer-receiving arrangements. In this way, the fluid under pressure can be discharged via a passage opened up between said washer and the annular projection. The term "curve" is used to mean that the surface of the washer, as defined between its inner perimeter and its outer perimeter, takes on a concave shape relative to the washer-receiving arrangements. Thus, the washer does not start vibrating and does not generate any undesired noise. In addition, during deflation, the movement of the washer consists solely in a curvature movement so that no portion of the washer comes to strike any portion of the device. The device is of simple, safe, and rational design.

In a particular embodiment, the arrangements for receiving the washer are suitable for forming, on a first side of the washer, circumferential bearing zones at the inner and outer perimeters of said washer.

The circumferential bearing on the inner and outer perimeters of the washer, combined with the pressure of the gaseous fluid, prevents to an even greater extent the washer from starting to vibrate and from generating undesired noise.

Preferably, and to improve the sealing, in the rest position, the annular protuberance bears in forced manner against the protective washer, thereby constraining said washer to deform elastically, and in particular to curve. During the deflation, the gaseous fluid under pressure that is discharging via the discharge orifice constrains the washer to curve to a greater extent to open up the discharge passage.

In a particular embodiment, the arrangements for receiving the washer are in the form of a shaped-section groove.

Advantageously, the washer-receiving groove is V-shaped in cross-section. Thus, the outer zone of the groove, namely the outer branch of the V-shape, makes it possible to form circumferential bearing at the outer perimeter of the washer, while the inner zone of the groove, namely the inner branch of the V-shape, makes it possible to form circumferential bearing at the inner perimeter of the washer.

BRIEF DESCRIPTION OF THE SEVERAL VIEWS OF THE DRAWINGS

Other characteristics and advantages of the invention appear clearly from the following description that is given below by way of non-limiting indication, with reference to the accompanying figures, in which.

DETAILED DESCRIPTION

Figure 1:
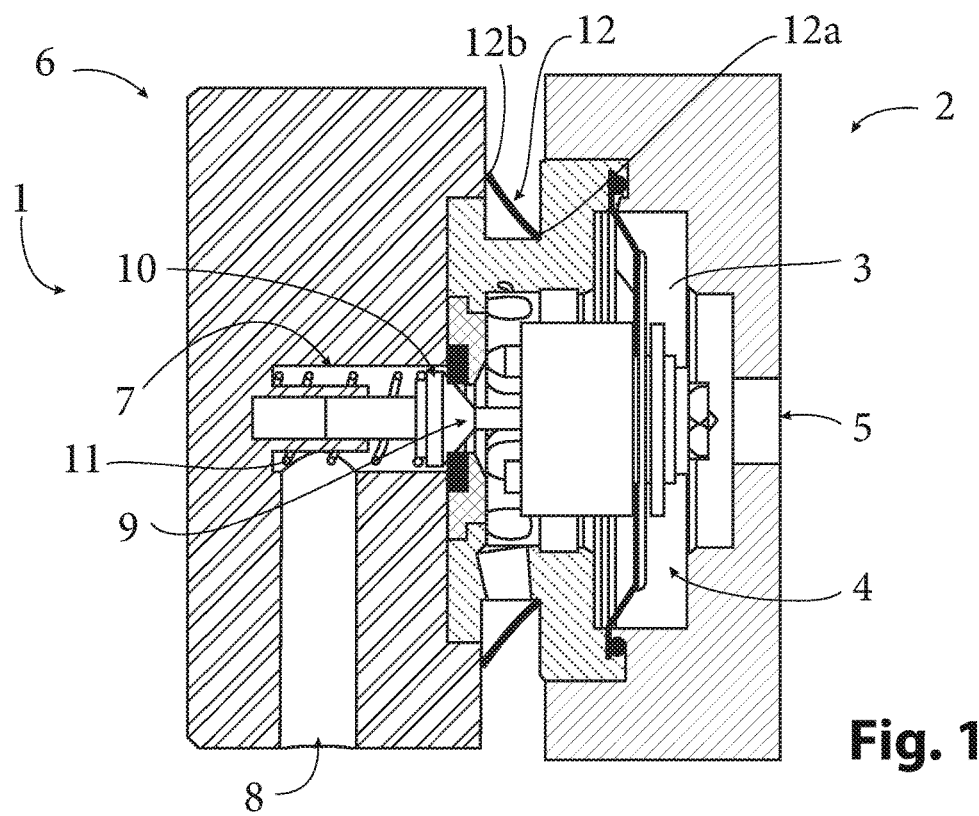
FIG. 1 is a diagrammatic view in longitudinal section of a state-of-the-art inflation/deflation device in the rest position.
Figure 2:
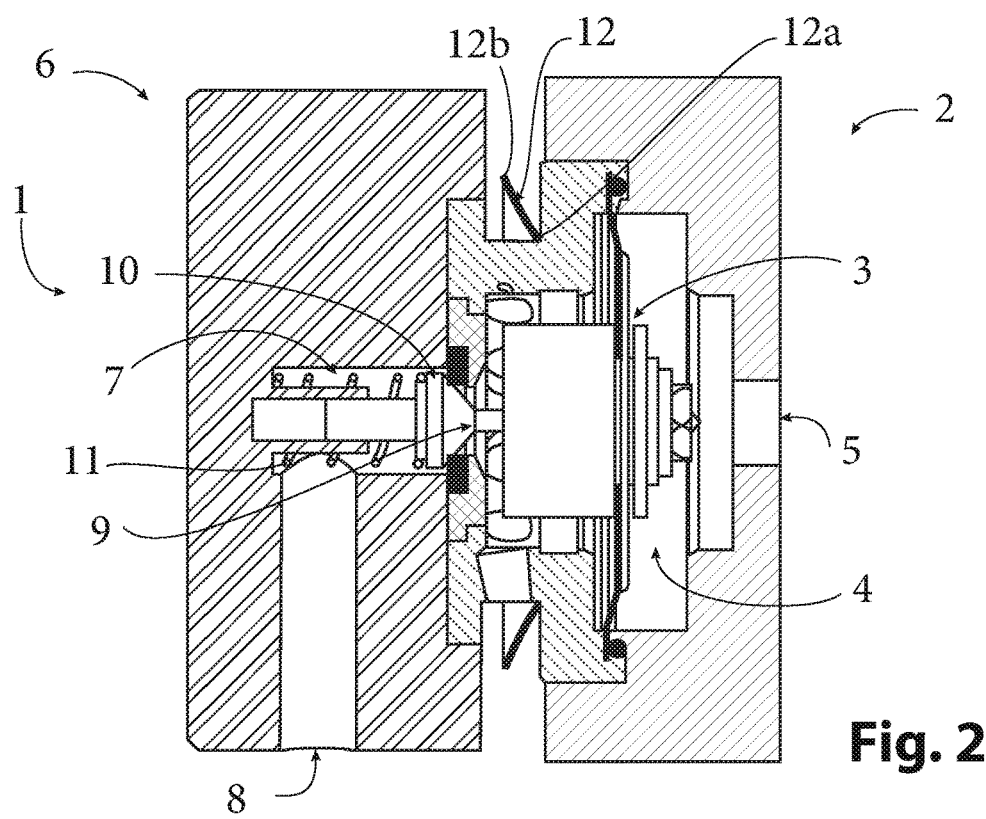
FIG. 2 is a diagrammatic view similar to the FIG. 1 view, showing the device in the deflation position.

For reasons of simplification, the portions or elements that are found identically or similarly in the invention described below and in the state of the art shown in FIGS. 1 and 2 are identified by like numerical references.

Figure 3:
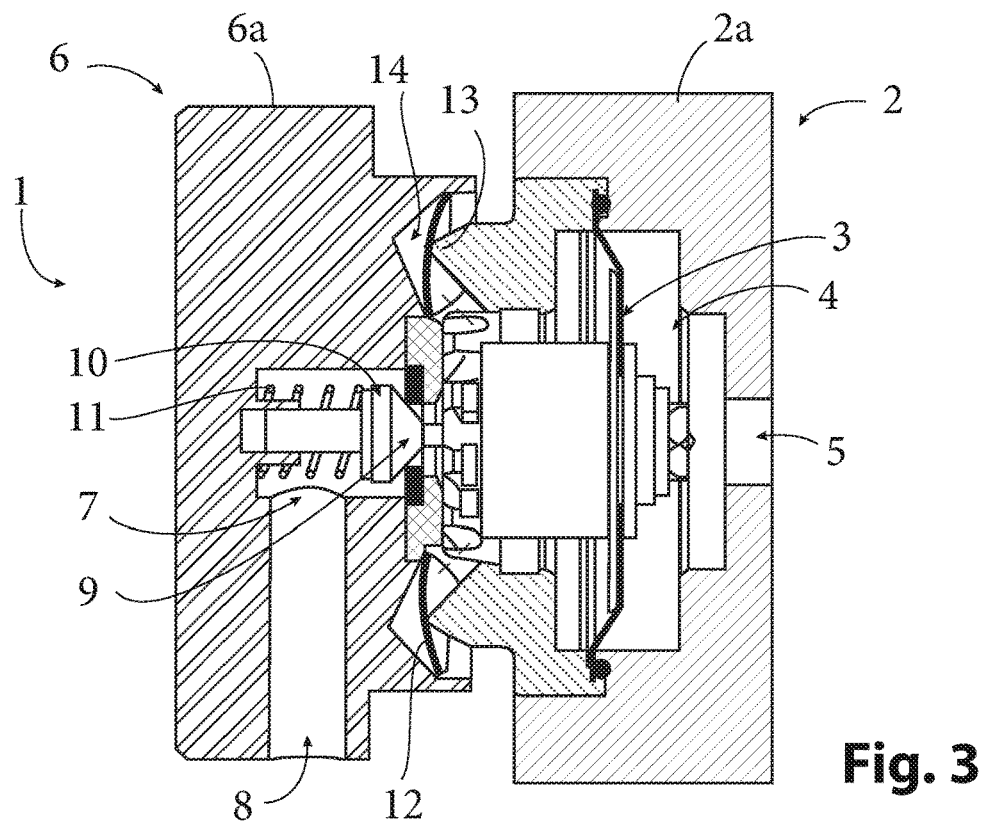
FIG. 3 is a diagrammatic view in longitudinal section of an inflation/deflation device of the invention in the rest position.
Figure 4:
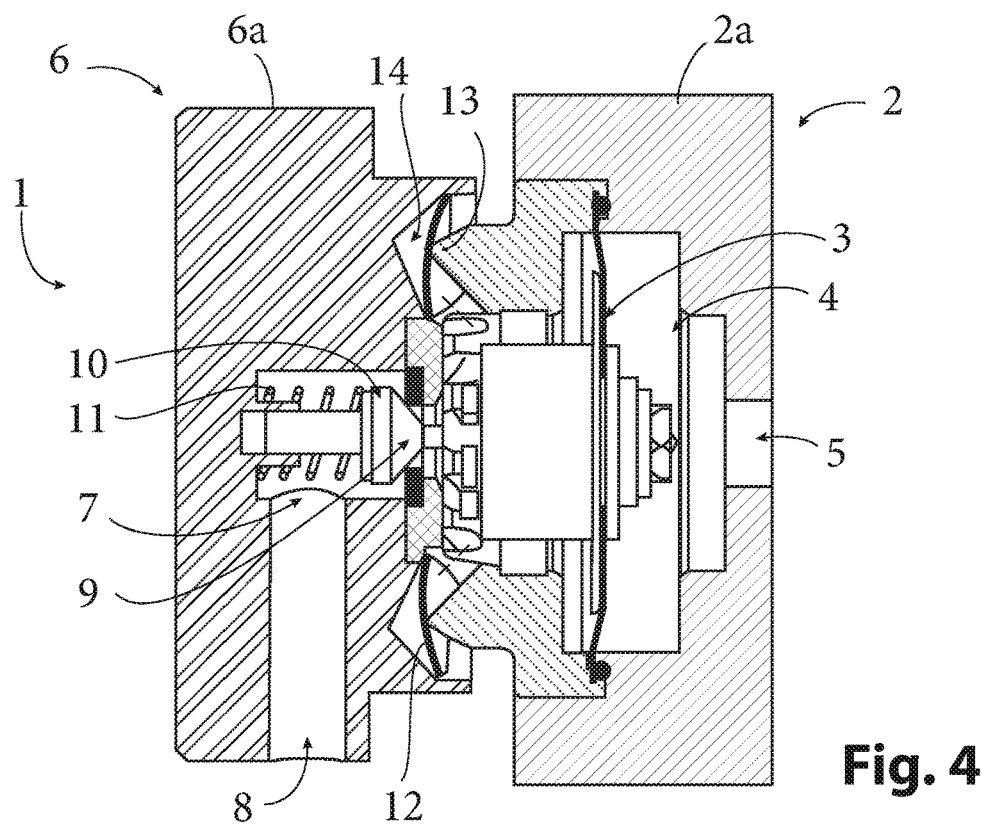
FIG. 4 is a diagrammatic view similar to the FIG. 3 view, showing the device in the deflation position.

FIGS. 3 and 4 show, in longitudinal section, a pneumatic device 1 that is controlled and sealed for inflating/deflating a confinement capacity such as a tire of a wheel of a vehicle, for example. In well known manner, the device 1 is made up of two portions that define two chambers.

The first portion 2 is in the form of a hollow body 2a, e.g., a cylindrical hollow body. The first chamber 4 defined inside the hollow body 2a communicates with the outside of the device 1 via an intake orifice 5 provided in one of the circular bases of said cylindrical hollow body 2a. This intake orifice 5 is designed to receive injection means (not shown) for injecting a gaseous fluid under pressure, e.g., compressed air.

The first portion 2 includes a control system 3 mounted to slide in a first chamber 4 under the effect of injection of a gaseous fluid under pressure via said intake orifice 5. The control system 3 projects from the other end of the hollow body 2a, opposite from the intake orifice 5, and is secured to a valve member 10. The base of the cylindrical body 2a from which the control system 3 projects is provided with an annular protuberance 13 arranged concentrically relative to said control system 3, and relative to the generatrix of the cylindrical hollow body 2a.

The second portion 6 of the device 1 is coupled in any suitable manner to the first portion 2, and, in the same manner as the first portion 2, is in the form of a preferably cylindrical hollow body 6a. The second chamber 7 defined inside the hollow body 6a communicates firstly with a confinement capacity for confining a gas under pressure (which capacity is not shown), such as a tire of a wheel of a vehicle, for example, and via an inflation/deflation orifice 8, and secondly with the outside of the device 1 via a discharge orifice 9. The discharge orifice 9 is provided along the axis of the generatrix of the cylindrical hollow body 2a of the first portion 2. The discharge orifice 9 faces the control system 3, and makes it possible, in particular, to expel, between the first and second portions 2, 6, a gaseous fluid coming from the second chamber 7, and coming more particularly from the capacity via the inflation/deflation orifice 8.

The second portion 6 includes a valve member 10 suitable for taking up a rest position in which it closes off the discharge orifice 9 and an inflation/deflation position, opposing a resilient return member 11, such as a spring, and in which it opens said discharge orifice 9.

The valve member 10 is secured to the control system 3, through the discharge orifice 9, so that when the control system 3 slides towards the valve member 10, said valve member 10 is pushed away by the control system 3 and slides away to open said discharge orifice 9.

On a face facing the first portion 2, the second portion 6 is provided with a shaped-section groove 14 arranged concentrically to the discharge orifice 9, and in correspondence with the annular protuberance 13 of the first portion 2. This shaped-section groove 14 is V-shaped in cross-section. This groove 14 receives a protective washer 12.

The protective washer 12 is made of an elastomer material, and is arranged in the washer-receiving groove 14 in a manner concentric to the discharge orifice 9 and bearing against said second portion 6. More precisely, the washer 12 is arranged in the second portion 6 in such a manner that said second portion 6 bears circumferentially against the inner and outer perimeters of the washer 12. More precisely, the outer zone of the groove 14, namely the outer branch of the V-shape, makes it possible to establish the outer circumferential bearing and, in the same way, the inner zone of the groove 14, namely the inner branch of the V-shape makes it possible to establish the inner circumferential bearing.

The first and second portions 2, 6 are arranged in such a manner that the annular protuberance 13 of the first portion 2 bears face-on against said protective washer 12. Preferably, the bearing takes place in forced manner so that the washer 12 is constrained to deform elastically and in particular to curve towards the second portion 6.

In this way, the discharge orifice 9, the control system 3, and more generally the inside of the device 1 are confined in sealed manner in a space defined between the annular protuberance 13 and the protective washer 12.

This washer 12, in combination with the contact of the annular protuberance 13, makes it possible to seal the device 1 and to protect it from any spraying or splashing of mud, water, dust, or any other undesirable element. The forced bearing between the washer 12 and the annular protuberance 13 makes it possible to further optimize this sealing.

In the rest position, the washer 12 finds itself in bearing firstly against the second portion 6 and at the inner and outer perimeters of said washer 12, and secondly against the first portion 2 and at the surface of the washer 12 defined between said inner and outer perimeters.

For deflating a capacity connected to the device 1 via the inflation/deflation orifice 8, it suffices to inject a fluid under pressure via the intake orifice 5. The fluid under pressure causes the control system 3 to slide towards the second portion 6. The control system 3 sliding causes the valve member 10 to slide in opposition to the resilient return means 11 in such a manner as to open the discharge orifice 9. The fluid under pressure present in the capacity then discharges via the discharge orifice 9 and finds itself in the space defined between the annular protuberance 13 and the protective washer 12. The pressure of the fluid that is discharging constrains the washer 12 made of an elastomer material to deform elastically, and in particular to curve more, so as to release the bearing of the annular protuberance 13, and thereby to open up a fluid discharge passage.

While the fluid under pressure is being expelled, i.e., while a tire of a vehicle wheel, for example, is being deflated, the washer 12 remains pressed against the second portion 6 under the effect of the force exerted by the pressure of the fluid that is discharging. In this manner, the washer 12 does not start vibrating and does not generate any undesired noise.

In addition, the V-shape of the shaped-section member 14 makes it possible to open up a space allowing the washer 12 to deform elastically and to curve towards said second portion 6. While the washer 12 is curving, it does not strike any portion violently. Thus, no violent impact or noise is generated.

As appears from the above, the invention provides a sealed inflation/deflation device 1 in which the noise generated by it operating is reduced. Such a device 1 may, advantageously, equip military vehicles without being detrimental to their stealth. The device 1 of the invention is of simple, safe, and rational design.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An inflation/deflation device for automatically inflating/deflating a confinement capacity for confining a gaseous fluid under pressure, said device comprising:
   a first portion provided with an intake orifice for taking in a gaseous fluid under pressure, and a second portion provided firstly with an inflation/deflation orifice designed to communicate with the confinement capacity, and secondly with a discharge orifice opening out between the first and second portions;
   a valve member control system for inflation/deflation operations; and
   an elastically deformable washer mounted between the first and second portions and around the discharge orifice for protecting the discharge orifice from external atmospheric agents;
   said inflation/deflation device being characterized in that one of the first and second portions is provided with arrangements for receiving the washer, which arrangements are suitable for allowing said washer to deform elastically, under the effect of a pressure of a gaseous fluid discharging through the discharge orifice, so as to release face-on bearing formed by an annular protuberance provided on the other of the first and second portions, and so as to generate a fluid discharge passage between said annular protuberance and said washer;
   wherein the washer-receiving arrangements are in the form of a groove that is V-shaped in cross section.

2. The inflation/deflation device according to claim 1, wherein the arrangements for receiving the washer are suitable for forming, on a first side of the washer, circumferential bearing zones at the inner and outer perimeters of said washer.

3. The inflation/deflation device according to claim 1, wherein when the device is in a rest position, the protuberance bears in forced manner against the washer, thereby constraining said washer to deform elastically.

\* \* \* \* \*